United States Patent Office 2,830,966
Patented Apr. 15, 1958

2,830,966

UNSATURATED POLYESTER RESIN COMPOSITION CONTAINING INDAN CARBOXYLIC ACIDS AND PROCESS OF PREPARING THE SAME

John C. Petropoulos, South Norwalk, Conn., assignor to American Cyanamid Company, New York, N. Y., a corporation of Maine No Drawing. Application February 11, 1955
Serial No. 487,710

20 Claims. (Cl. 260—45.4)

This invention relates to unsaturated polyester resin compositions and to the process of preparing the same. More particularly, this invention relates to polyester resin compositions comprising an unsaturated polyester resin and a polymerizable compound containing the polymerizable group $CH_2=C<$, wherein the polyester resin is prepared by reacting a polyhydric alcohol with an alpha, beta unsaturated polycarboxylic acid and a polycarboxylic acid having the formula:

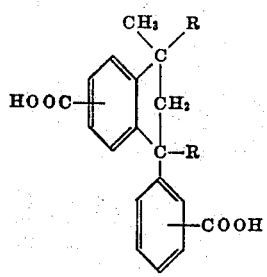

wherein R is an alkyl group containing 1 to 4 carbon atoms.

One of the objects of the present invention is to produce polymerizable unsaturated polyester resin compositions, which may be polymerized to form hard, glossy laminates. A further object of the present invention is to produce polymerizable unsaturated polyester resin compositions such as those set forth hereinabove and in greater detail hereinbelow and to the product thus produced. These and other objects of the present invention will be discussed in greater detail hereinbelow.

This is a continuation-in-part of my earlier filed patent application, having the Serial No. 414,860, filed March 8, 1954, now abandoned, entitled "Novel Compositions of Matter and Processes of Preparing Same." This application discloses and claims the method of preparing these novel acids and their use in the preparation of alkyd resins.

The starting materials utilized in the preparation of the dicarboxylic acids of the present invention are substituted styrenes having an alkyl group or a halo group in the alpha position and a methyl group on the ring. The alkyl group in the alpha position may be any one of methyl, ethyl, propyl, and butyl. The propyl group may be either n-propyl or isopropyl and the butyl group may be either n-butyl, isobutyl or tertiary butyl. The methyl group on the ring may be in either the ortho, meta or para position. Representative of the class of alkyl substituted styrenes which may be used in the practice of the process of the present invention are α,o-dimethylstyrene, α,m-dimethylstyrene, α,p-dimethylstyrene, α-ethyl-o-methylstyrene, α-ethyl-m-methylstyrene, α-ethyl-p-methylstyrene, α-propyl-o-methylstyrene, α-propyl-m-methylstyrene, α-propyl-p-methylstyrene, α-butyl o-methylstyrene, α-butyl-m-methylstyrene, α-butyl-p-methylstyrene and the like. In place of the alkyl groups containing between 1 and 4 carbon atoms which may be substituted on the side chain in the α position, one may utilize the halo substituents such as the chloro, bromo, iodo and fluoro. Representative of this class of compounds are α-chloro-m-methylstyrene, α-bromo-p-methylstyrene, α-iodo-o-methylstyrene, α-fluoro, p-methylstyrene and the like. The methyl substituent on the ring may be the sole substituent on the ring or it may be accompanied by other substituents such as other alkyl groups, halo groups, such as those mentioned hereinabove, and the like. In order that the process for the preparation of the dimers utilized in the practice of the process of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

DIMERIZATION OF α, p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer, is washed free of acidic material, with water and is distilled to yield 250 parts of a colorless oil having a boiling point of 142–144° C. at 0.8 mm. This oil solidifies and has a melting point of 37–38° C. uncorrected.

DIMERIZATION OF α-ETHYL-p-METHYLSTYRENE

To 400 parts of toluene at 5° C., there is added slowly 70 parts of 95% sulfuric acid followed by 144 parts of α-ethyl-p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorlss liquid having a boiling point of 160–165° C. at 1 mm.

DIMERIZATION OF α,META-DIMETHYLSTYRENE

To 200 parts of toluene at 0–5° C., there is added slowly 35 parts of 95% sulfuric acid, 65 parts of α,m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure.

DIMERIZATION OF CRUDE α,p-DIMETHYL-STYRENE

To 368 parts of toluene at 10° C., there is added slrwly 50 parts of anhydrous aluminum chloride followed by 516 parts of crude (undistilled) α,p-dimethylstyrene dissolved in 368 parts of toluene while maintaining the temperature below 10° C. After a 20-minute reaction time, the mixture is hydrolyzed with water and the organic layer is collected and dried. The organic material is distilled to give 150 parts of a colorless oil having a boiling point of 138–140° C. at 0.5–1 mm.

DIMERIZATION OF α,p-DIMETHYLSTYRENE

A mixture of 310 parts of freshly distilled α,p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure.

PREPARATION OF 3-(4-CARBOXYPHENYL)-1,1,3-TRIMETHYL-5-INDAN CARBOXYLIC ACID

Into a suitable reaction vessel equipped with thermometer, stirrer and reflux condenser, there is introduced 34 parts of the dimer of α,p-dimethylstyrene, 57 parts of concentrated nitric acid and 80 parts of water and the mixture is refluxed for 48 hours. The yield, amounting to about 32 parts, was a light tan solid. This product is collected and washed free of acid with water. 10 parts of this product is dissolved in 150 parts of 1 N sodium hydroxide and there is added thereto 10 parts of potassium permanganate and the resulting mixture is allowed to reflux for ½ hour. The mixture is acidified and then treated with sodium sulfite, in order to reduce the manganese dioxide to manganese sulfate. This gave a yield of 11 parts of a light tan solid which after recrystallization from acetic acid became colorless and had a neutral equivalent of 162 and a melting point of 293–4° C. uncorrected.

*Analysis.*—Calculated for $C_{20}H_{20}O_4$: C, 74.05; H, 6.22; COOH, 27.79. Found: C, 73.83; H, 6.23; COOH, 27.73.

PREPARATION OF 3-(4-CARBOXYPHENYL)-1,1,3-TRIMETHYL-5-INDAN CARBOXYLIC ACID

Into an autoclave, there is introduced 26.4 parts of the dimer of α,p-dimethylstyrene, 66.2 parts of concentrated nitric acid and 61 parts of water and the mixture is heated slowly in the autoclave. At 150° C., an exothermic reaction develops and the temperature and pressure increased to 190° C. and 1000 p. s. i., respectively. After about 10 minutes at 190° C., the autoclave is cooled and the product amounting to about 26 parts (80% yield), is collected. The resulting product is a light tan solid having a melting point of 278–285° C. and had a neutral equivalent of 164. When this product is recrystallized from acetic acid, the colored nitration product impurities are substantially completely removed and the melting point is raised to 293–294° C.

PREPARATION OF 3-(4-CARBOXYPHENYL)-1,3-DIETHYL-1-METHYL-5-INDAN CARBOXYLIC ACID

A mixture of 14.6 parts of the dimer of α-ethyl, p-methylstyrene, 23 parts of concentrated nitric acid (specific gravity 1.42) and 30 parts of water is heated slowly in an autoclave until a temperature of 190–195° C. is reached. The reaction mixture is held at this temperature for 14 minutes and then allowed to cool to room temperature. The product, a light tan solid, having a neutral equivalent of 175–180, is collected in approximately 75–80% yield. The product thus produced may be further purified by recrystallization from glacial acetic acid or methyl isobutyl ketone.

PREPARATION OF 3-(3-CARBOXYPHENYL)-1,1,3-TRIMETHYL-6-INDAN CARBOXYLIC ACID

A mixture of 13 parts of the dimer of α,m-dimethylstyrene, 23 parts of concentrated nitric acid (specific gravity 1.42) and 30 parts of water are heated slowly in an autoclave until a temperature of about 190–195° C. is reached. The reaction mixture is held at this temperature for about 15 minutes and then allowed to cool to room temperature. The product, a light tan solid having a neutral equivalent of about 160–164 is collected in an approximate yield of 78–84%. Again this product may be further purified by recrystallization as in the preceding example.

In the preparation of the polymerizable unsaturated polyester resinous compositions of my invention, one may use in combination with the polycarboxylic acids having the following structural formula:

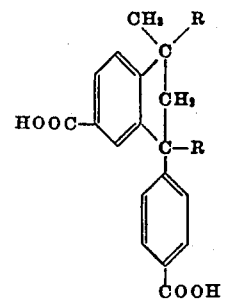

wherein R is an alkyl group containing 1 to 4 carbon atoms, any of the ethylenically alpha,beta unsaturated polycarboxylic acids such as maleic, fumaric, aconitic, itaconic and the like. The preferred polycarboxylic acid free of non-benzenoid unsaturation, which may be used, is 3-(4-carboxyphenyl)-1,1,3-trimethyl-5-indan carboxylic acid. For the sake of brevity, this acid has been called "phenolic acid." In preparing the unsaturated polyester resins, the alpha,beta unsaturated polycarboxylic acids should be present in an amount approximating at least 20% by weight of the total weight of polycarboxylic acids used and preferably in amounts varying between about 25% and 65% by weight based on the total weight of polycarboxylic acid present. If it is desired to make use of other saturated polycarboxylic acids, i. e., those which are free of non-benzenoid unsaturation, one could use such acids as phthalic, malonic, succinic, glutaric, sebacic, adipic, pimelic, suberic, azelaic, tricarballylic, citric, tartaric, malic and the like but in amounts less than a larger proportion of the total amount of polycarboxylic acid free of non-benzenoid unsaturation present. Whenever available, the anhydrides of these acids may be used or mixtures of the acids and/or anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in my invention are: ethylene glycol, diethylene glycol, propylene glycol, dipropylene glycol, butanediol-1,4, butanediol-1,3, butanediol-1,2, pentanediol-1,4, pentanediol-1,5, hexanediol-1,6, and the like. Additionally, such polyhydric alcohols as glycerol, pentaerythritol, dipentaerythritol and the like may be used in my invention.

In the preparation of the polymerizable unsaturated polyesters, one may use the polyhydric alcohols and the polycarboxylic acids in a proportion substantially equally about mol for mol and preferably an excess of alcohol approximating 15% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and not lower than about 20 and, preferably an acid number from about 35 to 40. The polymerizable unsaturated polyesters are admixed with a monomeric compound containing the polymerizable $CH_2=C<$ group to give a composition that may be cured to a stable thermoset condition. One may use about 10 parts by weight of the monomeric material to about 90 parts of the unsaturated polyester resin up to about 50 parts of the monomeric material to about 50 parts of the polymerizable unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in my invention are such as styrene, side-chain alkyl and halo substituted styrenes such as alpha, methylstyrene, alpha chlorostyrene, alpha ethylstyrene and the like or alkyl and halo ring-substituted styrene such as ortho, meta and para-alkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachloro-diallyl phthalate, allyl alcohol, methallyl alcohol, allyl acetate, allyl methacrylate, diallyl carbonate, allyl lactate, allyl alpha-hydroxyisobutyrate, allyl trichloro-silane, allyl acrylate, diallyl malonate, diallyl oxalate, allyl gluconate, allyl methylguconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

In order that the present invention may be more completely understood, the following examples are set forth in which all parts are parts by weight. These examples are set forth primarily for the purpose of illustration and any specific enumeration of details set forth therein should not be interpreted as limitations on the case except as is indicated in the appended claims.

Example 1

Into a suitable reaction vessel equipped with stirrer, thermometer, inert gas inlet and a steam jacketed condenser, there is introduced 409 parts of ethylene glycol, 196 parts of maleic anhydride and 1096 parts of 3-(4-carboxyphenyl)-1,1,3-trimethyl-5-indan carboxylic acid. The charged materials were heated gradually to about 190-210° C. while bubbling carbon dioxide through the reaction mass to aid in the removal of water. The temperature of the charge is maintained at 190° C.-210° C. until the acid number is 30. The mass is cooled to about 150–160° C., whereupon 0.38 part of hydroquinone is added and stirred in for about 5 minutes. The product is then poured into trays to cool. The polyester resin thus prepared was a hard, glass-like mass when cooled.

Example 2

700 parts of the polyester resin prepared according to Example 1 was dissolved in 300 parts of monomeric styrene. The mixture when thoroughly dispersed is catalyzed with 10 parts of benzoyl peroxide. A glass cloth laminate is prepared by successively saturating 12 plies of 181 weave glass cloth with the catalyzed resin mix. The laminate is cured by pressing under 30 p. s. i. to a thickness of ⅛ inch for 10 minutes at 105° C. The resulting laminate is translucent, tough and rigid. It is capable of withstanding immersion in hot aqueous solutions.

Example 3

Into a suitable reaction vessel equipped as in Example 1, there is introduced 502 parts of propylene glycol, 294 parts of maleic anhydride and 972 parts of 3-(4-carboxyphenyl)-1,1,3-trimethyl-5-indan carboxylic acid. The reaction charge is heated to about 190–210° C. and maintained at that temperature until an acid number of about 24 is reached. The mass is cooled to about 145–160° C., whereupon 0.36 part of hydroquinone is added and stirred for about 5 minutes. The product is poured into trays for cooling. The polyester resin thus prepared was hard and glass like when cool but brittle enough to be broken up readily.

Example 4

650 parts of the polyester resin prepared according to Example 3 was dissolved in 350 parts of paramethyl styrene. The mixture is catalyzed with 10 parts of benzoyl peroxide and poured between two glass plates that are sealed together on three edges by a suitable gasket material. The resinous composition was cured by heating at 60° C. for 3 hours followed by 30 minutes at 100° C. The cast material was clear and rigid and exhibited resistance to aqueous as well as non-aqueous solutions.

Example 5

Example 2 is repeated in which 600 parts of the polyester of Example 1 is dissolved in a mixture of 200 parts of monomeric styrene and 200 parts of diallyl phthalate. The mix is catalyzed with 10 parts of tertiary butyl hydroperoxide. A glass cloth laminate is prepared as in Example 2 by successively saturating a plurality of plies of glass cloth with the catalyzed resin mix. The laminate is cured by pressing under 50 p. s. i. at 110° C. for 10 minutes. The resulting laminate was hard, rigid and capable of withstanding immersion in hot aqueous solutions.

Example 6

800 parts of the polyester resin prepared according to Example 4 and 200 parts of triallyl cyanurate are blended together to form a homogeneous mass and there is added thereto 10 parts of methyl ethyl ketone peroxide and 0.1 part of cobalt naphthenate. The resinous composition thus catalyzed was cured by heating at 60° C. for 3 hours followed by 30 minutes at 100° C.

Amongst the polycarboxylic acids which may be used to prepare the polyester resins of the present invention are 3-(4-carboxyphenyl)-1,1,3-trimethyl-5-indan carboxylic acid, 3-(4-carboxyphenyl)-1,3-diethyl-1-methyl-5-indan carboxylic acid, 3-(4-carboxyphenyl)-1,3-dipropyl-1-methyl-5-indan carboxylic acid, 3-(4-carboxyphenyl)-1,3-dibutyl-1-methyl-5-indan carboxylic acid, 3-(3-carboxyphenyl)-1,1,3-trimethyl-6-indan carboxylic acid, 3-(3-carboxyphenyl)-1,3-diethyl-1-methyl-6-indan carboxylic acid, 3-(3-carboxyphenyl)-1,3-dipropyl-1-methyl-6-indan carboxylic acid, 3-(3-carboxyphenyl)-1,3-dibutyl-1-methyl-6-indan carboxylic acid, 3-(4-carboxyphenyl)-1,3-dichloro-1-methyl-5-indan carboxylic acid, 3-(4-carboxyphenyl)-1,3-dibromo-1-methyl-5-indan carboxylic acid, 3-(4-carboxyphenyl)-1,3-diiodo-1-methyl-5-indan carboxylic acid, 3-(3-carboxyphenyl)-1,3-dichloro-1-methyl-6-indan carboxylic acid; 3-(3-carboxyphenyl)-1,3-dibromo-1-methyl-6-indan carboxylic acid; 3-(3-carboxyphenyl)-1,3-diiodo-1-methyl-6-indan carboxylic acid; 3-(2-carboxyphenyl)-1,1,3-trimethyl-7-indan carboxylic acid; 3-(2-carboxyphenyl)-1,3-diethyl-1-methyl-7-indan carboxylic acid; 3-(2-carboxyphenyl)-1,3-dipropyl-1-methyl-7-indan carboxylic acid; 3-(2-carboxyphenyl)-1,3-dibutyl-1-methyl-7-indan carboxylic acid; 3-(2-carboxyphenyl)-1,3-dichloro-1-methyl-7-indan carboxylic acid; 3-(2-carboxyphenyl)-1,3-dibromo-1-methyl-7-indan carboxylic acid; 3-(2-carboxyphenyl)-1,3-diiodo-1-methyl-7-indan carboxylic acid and the like. Obviously, these acids may be used either singly or in combination with one another.

In the preparation of the unsaturated polyester resins of the present invention, it is unnecessary to use a catalytic material as the acids and the dihydric alcohols will readily react at elevated temperatures to produce the polyester resin. When the unsaturated polyester resin is combined with the polymerizable monomeric material, however, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur resins and the like. The concentration of the inhibitor is preferable and as a general rule less than about 1% by weight is usually sufficient. However, with the preferred inhibitors, e. g., polyhydric phenols and aromatic amines, one may make use of such small amounts as 0.01%–0.1% by weight.

The unsaturated polyester resins of the present invention will find application in a great plurality of fields such as in the preparation of laminates and other reinforced plastics, coating compositions, adhesive compositions, molding compositions, potting and the like. These polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic superoxides, the alcoholic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary-butyl hydroperoxide, usually called tertiary-butyl peroxide and terpene oxides, e. g., ascaridole. Still other polymerization catalysts might be used in some instances, e. g., soluble cobalt salts (particularly the linoleate and naphthenate), p-toluene sulfonic acid, aluminum chloride, stannic chloride and boron trifluoride.

The compositions of the present invention may be used alone or in admixture with a filler or a dye, pigment, opacifier, lubricant and the like. Among the fillers which may be employed are alpha cellulose pulp, asbestos fibers, cotton flock, chopped cloth cuttings, glass fibers, wood flour, mica dust, sand, clay, diatomaceous earth and the like.

Natural or other synthetic resins and other modifiers may be incorporated into the unsaturated polyester resinous compositions of this invention in order to modify the latter and to obtain products which may be especially suited for a particular service application. Examples of such modifying agents are shellac, ester gums, cellulose esters and ethers, urea-aldehyde resins, aminotriazine-aldehyde resins (e. g. melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, conventional alkyd resins of the nonpolymerizable type, etc. The polymers and copolymers of this invention also may be modified by incorporating therewith rubber or synthetic rubber-like products.

If it is desired, one may use a promoter in combination with the catalytic agent in order to accelerate the cure of the polymerizable polyester resin composition to a thermoset state. Amongst the promoters which may be utilized are those disclosed in the U. S. Patents 2,466,800 and 2,480,928. Particularly advantageous are the mercaptans such as n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, and the like. The dialkyl substituted anilines are additionaly useful as promoters, particularly the dimethyl aniline, diethyl aniline, dipropyl aniline, dibutyl aniline and the like. Obviously, these promoters can be used either singly or in combination with one another.

I claim:

1. A process for preparing an unsaturated polyester resin composition comprising heat reacting an unsaturated polyester resin with a polymerizable compound containing a $CH_2=C<$ group, wherein said polyester resin is the reaction product of a polyhydric alcohol, an alpha, beta ethylenically unsaturated polycarboxylic acid and an acid having the formula:

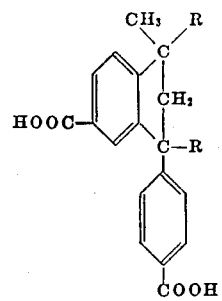

wherein R is an alkyl group containing 1 to 4 carbon atoms.

2. A process for preparing an unsaturated polyester resin composition comprising heat reacting an unsaturated polyester resin with a styrene, wherein said polyester resin is the reaction product of a polyhydric alcohol, an alpha,beta ethylenically unsaturated polycarboxylic acid and an acid having the formula:

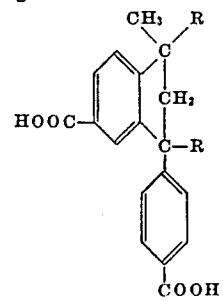

wherein R is an alkyl group containing 1 to 4 carbon atoms.

3. A process for preparing an unsaturated polyester resin composition comprising heat reacting an unsaturated polyester resin with styrene, wherein said polyester resin is the reaction product of a polyhydric alcohol, an alpha, beta ethylenically unsaturated polycarboxylic acid and an acid having the formula:

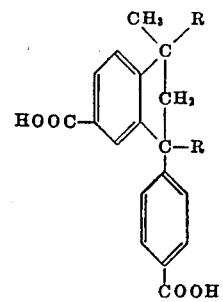

wherein R is an alkyl group containing 1 to 4 carbon atoms.

4. A process for preparing an unsaturated polyester resin composition comprising heat reacting an unsaturated polyester resin with diallyl phthalate, wherein said polyester resin is the reaction product of a polyhydric alcohol, an alpha,beta ethylenically unsaturated polycarboxylic acid and an acid having the formula:

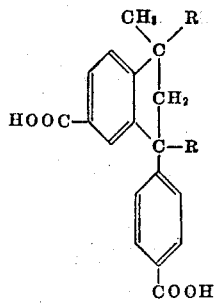

wherein R is an alkyl group containing 1 to 4 carbon atoms.

5. A process for preparing an unsaturated polyester resin composition comprising heat reacting an unsaturated polyester resin with triallyl cyanurate, wherein said polyester resin is the reaction product of a polyhydric alcohol, an alpha,beta ethylenically unsaturated polycarboxylic acid and an acid having the formula:

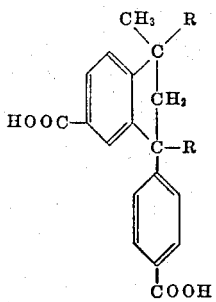

wherein R is an alkyl group containing 1 to 4 carbon atoms.

6. A process for preparing an unsaturated polyester resin composition comprising heat reacting an unsaturated polyester resin with a polymerizable compound containing a $CH_2=C<$ group, wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

7. A process for preparing an unsaturated polyester resin composition comprising heat reacting an unsaturated polyester resin with a styrene, wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

8. A process for preparing an unsaturated polyester resin composition comprising heat reacting an unsaturated polyester resin with styrene, wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

9. A process for preparing an unsaturated polyester resin composition comprising heat reacting an unsaturated polyester resin with diallyl phthalate, wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

10. A process for preparing an unsaturated polyester resin composition comprising heat reacting an unsaturated polyester resin with triallyl cyanurate, wherein said polyester resin is the reaction product of a polyhydric alcohol, an alpha,beta ethylenically unaturated polycarboxylic acid and 3-(4-carboxyphenyl)-1,1,3-trimethyl-5-indan carboxylic acid.

11. A composition of matter comprising a polymerizable mixture of an unsaturated polyester resin and a polymerizable compound containing a $CH_2=C<$ group wherein said polyester resin is the reaction product of a polyhydric alcohol, an alpha,beta ethylenically unsaturated polycarboxylic acid and an acid having the formula:

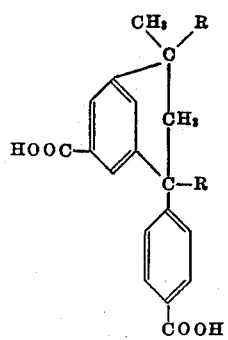

wherein R is an alkyl group containing 1 to 4 carbon atoms.

12. A composition of matter comprising a polymerizable mixture of an unsaturated polyester resin and a styrene, wherein said polyester resin is the reaction product of a polyhydric alcohol, an alpha,beta ethylenically unsaturated polycarboxylic acid and an acid having the formula:

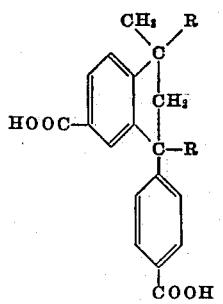

wherein R is an alkyl group containing 1 to 4 carbon atoms.

13. A composition of matter comprising a polymerizable mixture of an unsaturated polyester resin and styrene, wherein said polyester resin is the reaction product of a polyhydric alcohol, an alpha,beta ethylenically unsaturated polycarboxylic acid and an acid having the formula:

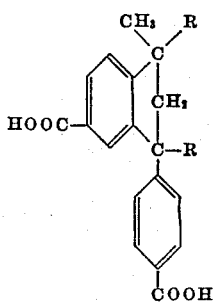

wherein R is an alkyl group containing 1 to 4 carbon atoms.

14. A composition of matter comprising a polymerizable mixture of an unsaturated polyester resin and diallyl phthalate, wherein said polyester resin is the reaction product of a polyhydric alcohol, an alpha,beta ethylenically unsaturated polycarboxylic acid and an acid having the formula:

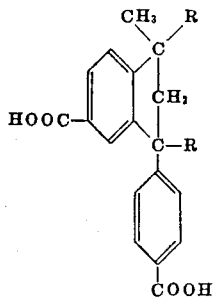

wherein R is an alkyl group containing 1 to 4 carbon atoms.

15. A composition of matter comprising a polymerizable mixture of an unsaturated polyester resin and triallyl cyanurate, wherein said polyester resin is the reaction product of a polyhydric alcohol, an alpha,beta ethylenically unsaturated polycarboxylic acid and an acid having the formula:

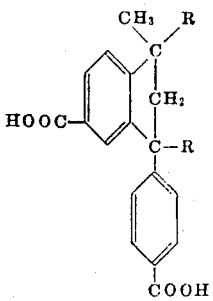

wherein R is an alkyl group containing 1 to 4 carbon atoms.

16. A composition of matter comprising a polymerizable mixture of an unsaturated polyester resin and a polymerizable compound containing a $CH_2=C<$ group wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

17. A composition of matter comprising a polymerizable mixture of an unsaturated polyester resin and a styrene wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

18. A composition of matter comprising a polymerizable mixture of an unsaturated polyester resin and styrene wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

19. A composition of matter comprising a polymerizable mixture of an unsaturated polyester resin and diallyl phthalate wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

20. A composition of matter comprising a polymerizable mixture of an unsaturated polyester resin and triallyl cyanurate, wherein said polyester resin is the reaction product of a polyhydric alcohol, an alpha,beta ethylenically unsaturated polycarboxylic acid and 3-(4-carboxyphenyl)-1,1,3-trimethyl-5-indan carboxylic acid.

References Cited in the file of this patent
UNITED STATES PATENTS
2,255,313    Ellis                Sept. 9, 1941

OTHER REFERENCES
Beilstein First Supplement, volume 9, page 417, 1932.

---

UNITED STATES PATENT OFFICE
CERTIFICATE OF CORRECTION

Patent No. 2,830,966                                  April 15, 1958

John C. Petropoulos

It is hereby certified that error appears in the printed specification of the above numbered patent requiring correction and that the said Letters Patent should read as corrected below.

Column 2, line 44, for "colorlss" read -- colorless --; column 4, line 23, for "phenolic acid" read -- phendic acid --; column 5, line 25, for "methylguconate" read -- methylgluconate --; column 10, line 1, for "unaturated" read -- unsaturated --.

Signed and sealed this 9th day of September 1958.

(SEAL)
Attest:

KARL H. AXLINE                                              ROBERT C. WATSON
Attesting Officer                                        Commissioner of Patents